(12) United States Patent
Howorka

(10) Patent No.: US 8,296,217 B1
(45) Date of Patent: Oct. 23, 2012

(54) METHOD AND APPARATUS FOR ENHANCING MARKET DATA FEED USING PROPRIETARY ORDER FLOW

(75) Inventor: Edward Richard Howorka, Denville, NJ (US)

(73) Assignee: MarketFactory, Inc., New York, NY (US)

(*) Notice: Subject to any disclaimer, the term of this patent is extended or adjusted under 35 U.S.C. 154(b) by 668 days.

(21) Appl. No.: 12/357,398

(22) Filed: Jan. 22, 2009

Related U.S. Application Data (60) Provisional application No. 61/022,701, filed on Feb. 22, 2008.

(51) Int. Cl.
*G06Q 40/00* (2012.01)
(52) U.S. Cl. ............ 705/37; 705/35; 705/36 R
(58) Field of Classification Search ........... 705/37, 705/35, 36 R
See application file for complete search history.

(56) References Cited

U.S. PATENT DOCUMENTS

| | | | |
|---|---|---|---|
| 7,366,690 B1* | 4/2008 | Howorka et al. | 705/35 |
| 2008/0275808 A1* | 11/2008 | Mackay | 705/37 |
| 2010/0205086 A1* | 8/2010 | Mackay | 705/37 |
| 2010/0293085 A1* | 11/2010 | Mackay | 705/37 |
| 2011/0040668 A1* | 2/2011 | Lee et al. | 705/37 |

* cited by examiner

*Primary Examiner* — Jagdish Patel
*Assistant Examiner* — Kevin Poe
(74) *Attorney, Agent, or Firm* — John M May

(57) ABSTRACT

Order flow information is used to provide traders with an enhanced market data feed. The external market data are overlaid with detailed internal customer order flow data to produce an enhanced virtual order book that more accurately reflects the best price and quantity available to traders at the receiving location and also the market liquidity behind that current best price. If a market impact overlay processor at a particular location closer to the exchange has access to customer order flow data from other more remote locations, the resultant enhanced virtual order book may not only be shared with traders at the closer location but also may be broadcast to market impact overlay processors at the remote locations, which may further enhance the shared data with more recent customer order flow data that would have not been received at the closer location at the time the enhanced data was broadcast.

9 Claims, 4 Drawing Sheets

METHOD AND APPARATUS FOR ENHANCING MARKET DATA FEED USING PROPRIETARY ORDER FLOW

CLAIM FOR PRIORITY

This application is based on and claims priority from provisional United States application filed on 22 Jan. 2008 under Ser. No. 61/022,701 and entitled "ARM Trading Architecture", the teachings of which are hereby incorporated by reference in their entirety.

FIELD OF THE INVENTION

The present invention relates generally to the interchange of data between a trader and an exchange, and more particularly to an automated system for using proprietary order flow information to provide an enhanced version of a received market data feed.

BACKGROUND

Exemplary Prior Art and Some of its Shortcomings

In a typical computerized exchange, orders received from various traders (including ever increasing numbers of trading automata) to buy or sell a particular financial instrument are sorted by price and time to thereby create a book of open (i.e., available) buy and sell orders that are typically separated by a price spread. As each new order is received by the exchange, the open order book is scanned by a matching engine in an attempt to identify a compatible counterparty for the requested quantity (or possibly a lesser quantity) at the requested price (or possibly a better price), whereupon the concerned traders are notified of the details (time, price, quantity, counterparty, etc) of their deal and the dealt portion of the order is removed from the open order book. The exchange also regularly reports to its subscribers summary "ticker" information about those completed deals, typically just the highest and lowest prices paid since the last such "ticker" report. If no such match is found or if only part of the newly submitted order can be filled, any undealt portion of that order may be either be cancelled or added to the open order book, in accordance with the instructions of the submitting trader. In particular, an "IOC" (Immediate Or Cancel) order will be automatically cancelled by the exchange if it cannot be matched at the time it is received, and a "GTC" (Good 'Til Canceled) is kept open for possible matching with future orders until either a match is found or any remaining portion of the original order has been cancelled.

Each exchange customer maintains one or more private bi-directional communication channels for the customer's proprietary Order Flow ("OF") events, which includes not only order submissions from the customer to the exchange as well as instructions to cancel previously submitted orders, but also acknowledgements from the exchange to the customer of those submissions and instructions as well as details of any resulting deals or cancellations.

Each exchange also provides one or more Market Data ("MD") feeds to its subscribers in the form of the best buy (bid) and sell (offer) prices currently available for a specified quantity of each financial instrument, possibly supplemented with the previously mentioned ticker information and/or with additional information concerning open orders at other prices or for other quantities. It should be understood that each exchange has its own proprietary protocol and format for distributing MD, with some MD feed protocols providing only limited data (for example, only a best price from an acceptable counterparty) at infrequent intervals (for example, every 500 milliseconds), and other MD feed protocols providing essentially full details of any change in the open order book in essentially real time, omitting only the name of the trader submitting that order and the time at which it was received and when it will expire.

A customer may have a variety of incoming and outgoing data feeds, for example:
Reuters (MD & OF)
Currenex (MD & OF)
Hotspot (MD & OF)
EBS Ai (MD & OF)
EBS Live (MD)

A customer may also have a variety of servers each hosting one or more feeds. The same Feed can be provided by multiple servers. However, since there is no industry standard for transmitting and receiving either MD or OF data, there is no industry standard for consolidating or aggregating multiple sources of such data into a usable single data stream.

Markets are global and dispersed. Customers are located across the globe, an institution's trading desks are located in several cities, automated proprietary trading platforms may be trading from multiple centers, and in the particular case of foreign currency (FX) exchanges, the traders are typically dealing with four different exchanges in four cities on three continents. Trading messages travel across networks conceptually at the speed of light, yet even this is too slow in today's high frequency automated trading context. While it only takes 20 microseconds for a message to travel between a co-located model and an exchange, it still takes approximately 20 milliseconds for a message to travel between New York and Chicago; this is a difference of three orders of magnitude. Between New York and London, the transmission time is about 40 milliseconds, between London and Tokyo it is about 120 milliseconds.

The term "timeslicing" describes the concept of sending updated market information on a timed basis, to thereby reduce transmission bandwidth. When each market update is sent, its contents reflect the state of the market at a particular time (or equivalently, any cumulative changes since the previous update). Another update is then scheduled to be sent a number of milliseconds later. Ideally, the delay reflects the (bandwidth-dependent) time that the communication lines are busy transmitting the original update—any new update sent during this time would have to be queued, resulting in obsolete market data. In fact, some exchanges have relatively long timeslicing intervals of 200-500 ms or longer. Information regarding sporadic potential opportunities—for example, favorable price changes—may be dropped from the market feed unless the new price is still in effect at the precise time another market update is being prepared. Any relevant market event (for example, an improved market price) is thus either dropped or is communicated with a delay ranging up to the full length of the timeslicing interval. To some extent, these limitations can be offset by restricting traders' ability to accept prices not yet visible at their trading floor and by submitting market feeds to different trading floors at different times and/or with different delays, but such expedients will be perceived as punitive by at least some of the more active exchange members, particularly those having several trading floors all located close to the exchange.

In the case of synchronized timeslicinq (where market updates are sent to all subscribers at the same time), many orders from many different subscribers are submitted immediately in response to the update. The new market state is not communicated until the next update is sent. Market impact of these orders thus invalidates the content of the market update very shortly after the update is sent. Therefore, the average "latency" (elapsed time from the time of the market event to the time of the report) in a synchronized timeslicing report is nearly equal to the timeslicing interval (twice what would have been expected had the trading events been spread uniformly across the interval in question).

Another factor that affects bandwidth requirements and related queuing and distribution delays is the amount of market information that is distributed to market participants. If the market information is sufficiently detailed to define the entire open order book (a "transparent" market) a higher bandwidth is required, not only because the amount of information is greater, but because some of the market data elements require more frequent updates (for example, available best price volume changes more frequently than the best price itself).

Moreover, each trader (or automated trading model) must limit its risk exposure to possible market volatility and thus cannot have a large net commitment (real or potential) in any particular instrument and will not be able to submit more than a few open orders at any given time. Thus, after the trader has submitted an order to a particular exchange, he normally must wait until that order has been accepted or cancelled before he can submit a revised or better price to the same exchange or the same offer to another exchange. Accordingly, when a favorable market price is transmitted by a remote exchange to a particular trader or trading model, it is not always to the institution's advantage for the trader to submit an order in response, particularly if other traders from the same institution are located closer to that remote exchange. To some extent this can be alleviated by providing a sophisticated order routing system that screens all outgoing orders from a particular trading floor, or even the entire institution, for possible conflicts and duplicates, and automatically cancels or re-routes some or all of the crossed or duplicate orders before they are transmitted to the exchange.

Particularly in the case of automated trading models that analyze the incoming market data in essentially real time for potentially profitable arbitrage trades involving multiple exchanges and/or multiple financial instruments, the trader or automated trading model having the most complete and up to date market data has a clear advantage. Not only will it be able to make profitable deals ahead of his competition, it will not waste valuable time submitting orders at prices that are no longer available or attempting to cancel orders that probably should not have been submitted in the first place. In particular, when market data is delayed by distance or bandwidth or the contents of market data is artificially limited by the exchange, the utilization and profitability of automated trading models is reduced.

SUMMARY DISCLOSURE OF PROPOSED SOLUTION(S)

The external market data typically received from an exchange by its customers are combined with internal proprietary order flow data not known to other unrelated exchange customers (such as pending orders from the receiving institution that are not yet reflected in the market data currently being transmitted by the exchange to all of its subscribers) to produce enhanced market data that will more accurately reflect the prices and quantities that will actually be available to traders and trading platforms at the receiving location resulting from newly submitted orders at either a better price (which may be reflected in a new best price) or at the current best price (which will be reflected in a changed or null available quantity at that price), or even at an inferior price (which may result in increased liquidity). That enhanced market data may then be distributed to one or more trading clients or other trading systems within the same premises, institution or organization, possibly further enhanced by more recent order flow from the receiving clients and systems, combined with similarly enhanced market data from other exchanges and/or converted into a different format with more or less frequent updates than the original market data feed(s).

Preferably, the various data are time stamped with the approximate time (or time interval) they would have been received at or transmitted from the exchange, and the recent customer order flow is input to a Market Impact Overlay ("MIO") processor which generates a time-ordered MIO data sequence which contains the order flow data for those customer orders (or instructions to cancel previously submitted orders) which have been recently submitted to the exchange, but for which (because of predictable technical reasons such as time slicing and transmission delays) sufficient time has not elapsed for them to be reflected in the current market data already received from the exchange. Concurrently, the received current market data is preferably input to a Virtual Order Book ("VOB") processor which not only converts the received market data into a raw VOB of respective "implied" orders that correspond to each of the currently available prices and quantities detailed in the most recently received market data, but which preferably also takes into account an estimate of "obscure" orders that would probably also be present at that same time in the order book maintained by the exchange, but are too far removed from the current market price to be included in the current market data. The raw VOB may then be combined with the MIO data to produce an enhanced VOB, as is described in more detail hereinafter.

Whenever there is a material change in either the MIO data or the raw VOB data, the VOB processor preferably combines the current MIO data with the current raw VOB to thereby regenerate the enhanced VOB (or equivalently, calculates the changes to the enhanced VOB resulting from the changes to the MIO and raw VOB data), preferably using the same matching criteria and cancellation policy as the exchange to delete not only any previously entered orders that have now been cancelled but also any previously entered buy or sell orders that would have resulted in completed deals once the recently submitted buy (or sell) orders in the customer order flow have been matched with any compatible sell (or buy) orders already present in the raw VOB.

In one preferred embodiment, the orders and other information (such as exchange generated cancellations and executed deals) contained in the recent customer order flow are preferably analyzed to identify any included details of "authentic" customer orders that have already been received by the remote exchange but no matching deal was found so they would have been placed in the exchange's open order book and a sufficient time has elapsed that they are presumably now reflected in the received market data and thus are already included in the raw VOB, in which case not only is that "authentic" order removed from the MIO data, the corresponding data in the raw VOB is henceforth identified and maintained as an "authentic" portion of any similarly priced implied order, and is removed from the raw VOB only after subsequent OF or MD data establishes that it would have been dealt or cancelled by the exchange.

In accordance with another aspect of a presently preferred embodiment, the enhanced market data may optionally be distributed as market views of the enhanced VOB, which may be in the same format as a particular source exchange or in any other desired format.

In a particularly advantageous geographically distributed embodiment, a MIO processor at a particular location closer to the exchange may have access to customer OF data from one or more remote locations, and the resultant enhanced market data (preferably in the form of an enhanced VOB) is shared not only with traders at the closer location but also is broadcast to those more remote locations, whose respective VOB processors may further enhance the shared enhanced MD with more recent OF data that would have not been received by the closer location at the time the enhanced MD was broadcast.

DETAILED DISCLOSURE OF PREFERRED EMBODIMENTS

Figure 1:
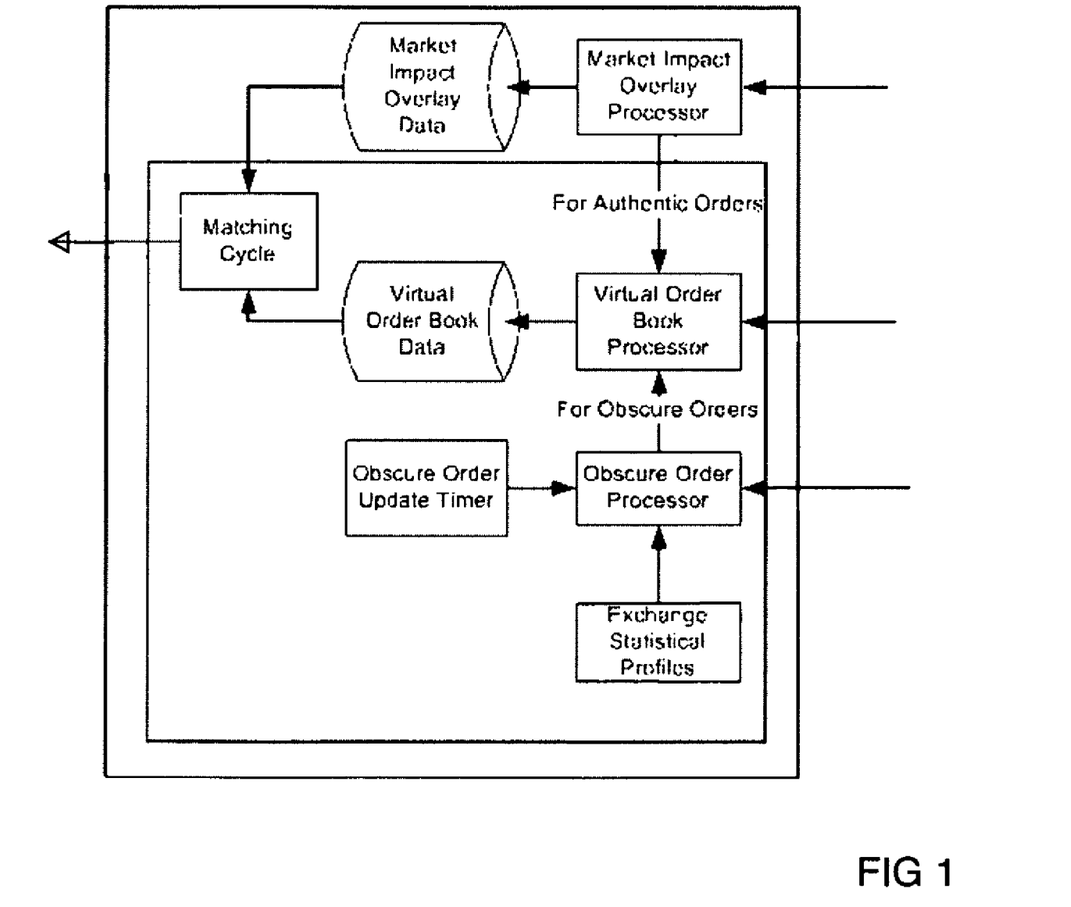
FIG. 1 is a functional block diagram of a basic exemplary MD enhancer which is responsible for market data from a single feed concerning a single financial instrument being traded on a single exchange and which combines that market data with the customer's proprietary order flow to form an enhanced VOB.

FIG. 1 is a functional block diagram of a basic MD enhancer module which includes the MIO processor and VOB processor functionality responsible for market data flow from a single feed (for example, Reuters "Market Data") for a single type of financial instrument (for example, Spot USD/JPY) being traded on a single exchange (for example, Reuters London).

In particular, all Order Flow (OF) for the involved institution (trader, trading floor, company or organization of associated companies) dealing on a particular exchange in a particular financial instrument is processed by a MIO processor which preferably maintains a time ordered list of recently submitted orders and cancels (MIO Data) each time stamped with its presumed (future) time of receipt at the exchange, and discards (or ignores) each such recently submitted order or cancel only after it is now reflected in the market data received from the exchange. The cutoff time for such a discard is based on exchange specific heuristics and observations concerning processing and transmissions latencies, frequency and timing of market reports, etc, which establishes a time window or time delta relative to the time stamped presumed time of receipt at the exchange during which there is a high probability (for example a confidence level of 95%) that a particular order or cancel has not only been received and processed by the exchange, but that any resultant change in the exchange order book has already been reflected in any similarly time stamped market data currently being received from the exchange. These time deltas are preferably updated periodically and a similar process is preferably used to establish the presumed (past) exchange time for MD and OF events that originated from the exchange but were not tagged with the relevant time by the exchange.

The VOB processor preferably maintains a current VOB data structure that represents an attempt to reconstruct at least the visible portion of the exchange's order book at the time the MD was last updated, by creating a number of "implied" orders from the current MD, each such implied order corresponding to an indicated total quantity available at an indicated price.

Since the incoming market data from the exchange will typically not indicate any prices and quantities more than a level or two behind the best price, and thus do not give a full picture of the market depth (liquidity), the VOB processor preferably also includes a separate process for creating "obscure" orders for other prices behind the indicated prices which include an estimate of the available quantity at each of those other price levels, which may be based on a combination of historical data derived liquidity curves and hints of additional liquidity based on different prices for "regular" and "best", and on previously visible implied orders that have in the meantime become bettered, preferably using a decay factor to reflect expected cancellations.

The reconstructed raw preferably also takes into account the current status of the customer's own previously submitted "authentic" orders to the extent sufficient time has elapsed since their submission for them to be now reflected in the received MD. In particular, once that time has elapsed and the authentic orders have been removed from the MIO data, a corresponding order for the same quantity is placed into the raw VOB, and that same quantity is subtracted from any similarly priced implied orders but will have no effect on any similarly priced obscure orders.

Each time updated MD is received from the exchange, the VOB is regenerated not only with newly calculated implied orders, but also with newly calculated obscure orders. The authentic orders remain in the VOB until either cancelled or until matched with a subsequent order.

The combining of the MIO data with the VOB data is performed by a matching engine which emulates the deal matching process at the exchange. Typically, this simply involves taking the MIO data one at a time and attempting to match it in against each successive entry in the VOB until a compatible match has been found, in which case the matched portion of the order is removed from both the VOB (to thereby create an Updated VOB) and from the MIO, an attempt is made to match any remaining unmatched portion in the MIO with subsequent entries in the VOB, and then the process is repeated for the next entry in the MIO. In the event that the matching process identifies not only a compatible authentic order but also a quantity of an implied or obscure order, precedence is given to the authentic order, however it may be restored in the event that the subsequent OF data confirms that it is still pending.

The advantage of performing such a redundant matching process locally rather than simply waiting for the official deal notification message to be received from the exchange, is that the customer obtains advance knowledge of a potentially market altering event: the customer's emulated matching engine has knowledge of the trader's own orders (and importantly, all the trading orders from any other more remotely located trading floor or automated trading platform from the same institution) even before those order has been received by the exchange.

The result is a stream of continually updated enhanced MD, which not only reflects transactions that have been processed by the exchange but for technical reasons such as reporting frequency and transmission latency are not immediately included in the received MD, but even reflects changes in available price and quantity resulting from orders that have not yet arrived at the exchange. Since the MIO and VOB data being matched at the customer site were not necessarily created in the same sequence as the actual orders would have arrived at the exchange, the entire matching process is preferably repeated each time there is a change to previously matched VOB data, or to previously matched data in the MIO.

Figure 2:
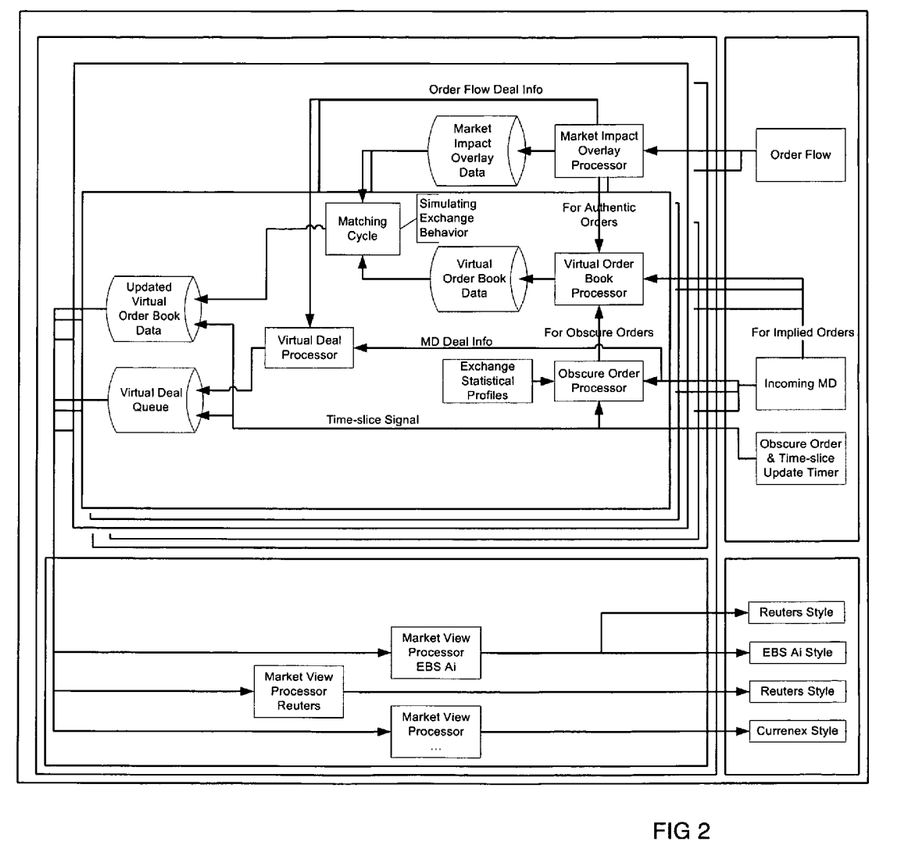
FIG. 2 is a block diagram of an exemplary MD enhancer system based on the MD enhancer of FIG. 1, but expanded to incorporate other feeds from the same and other exchanges, to thereby create multiple market views and deal views based on various combinations of feeds and exchanges.

Reference should now be made to FIG. 2, in which the basic MD enhancer system of FIG. 1 has been expanded in modular fashion to include an entire "atomic market" of interest (for example, a particular financial instrument such as SPOT USD/JPY), to thereby incorporate other feeds from the same and other exchanges, from which multiple market views and deal views may be generated based on various combinations of those feeds and exchanges. Although not explicitly shown in FIG. 2, such a modular system may be further expanded to include other atomic markets served by the same exchanges and market feeds.

Depending on trading volumes and data processing rates, more than one modular logical process can be implemented on the same physical processor and conversely a single logical process can be divided hierarchically into several processes each implemented on a different physical process. In the illustrated embodiment, the overall market view enhancement process 100 has three major components, an input interface 102 including an incoming exchange interface 104 and an incoming order interface 106, an output interface 108 including a plurality of customer specific data formatting components 110A, 110B, 110C, and a market data enhancing component 112.

MD enhancer 112 preferably includes a data distribution component 114 including a plurality of market view processors 116A, 116B, 116C which each are capable of composing and outputting a respective stream of market view information from the enhanced VOB (possibly consolidated or aggregated from other enhanced VOB's) using any defined methodology (timing, summaries, filtering, format, etc), and including market events from any defined source (the entire order book, or from one or more specified exchanges in one or more specified regions). In particular, it is possible to provide a trading model originally designed for operation with one exchange with market data originating from another exchange or from multiple exchanges, and then use customized router logic in a separate order router to determine how to route any resultant orders to the proper exchange. Data distributor 114 is preferably also capable of outputting the entire enhanced VOB in the native format used internally by MD enhancer 112, for subsequent possible analysis or enhancement by other processors that were designed for use with that same native format.

In the illustrated presently preferred embodiment, the heart of MD enhancer 112 is a hierarchy of a logically separate market level processing module 120 for each atomic market (for example, a particular financial instrument such as SPOT USD/JPY). Market level module 120 in turn includes several exchange level MIO processing modules 122 which each include one or more feed level VOB processing modules 124. Although not explicitly shown, the enhanced VOB output from several such market level modules 120 may be readily converted into a single aggregated enhanced VOB, since each exchange operates independently from the others and there is no need to maintain exact time synchronization between market events occurring on different exchanges.

For the most part, the individual components of MD enhancer 112 are the functional equivalents of the similarly named components of the basic MD enhancer of FIG. 1, and the previous description of the FIG. 1 embodiment is equally applicable to the FIG. 2 embodiment, with the exception of the Virtual Deal Queue (VDQ) 130 in the data feed level 124.

VDQ 130 is maintained by a connected virtual deal processor 132 which in turn is responsive to the same incoming MD as the was input at the data feed level 124 to the VOB processor, supplemented by the same OF as was input at the exchange level 122 to the MIO. As mentioned previously, the MD feed will typically include a summary ticker report on the highest and lowest prices dealt during the reported time slice, and the OF feed will include proprietary information about all deals made by the subscriber on the same exchange, including information about deals that were made after the last MD ticker report was generated. Accordingly, the VDQ processor 132 merely examines the recent OF for recent deal prices outside the last reported ticker and if so appends that price to the VDQ, which is then available for distribution to individual traders and trading platforms in accordance with their standing instructions to data distributor 114.

"Consolidation" is a mechanism that gives the customer the ability to combine MD concerning the same exchange, but reflecting different market events. For example, if a particular customer subscribes to two different MD feeds from the same exchange that reflect the same atomic market at different times with different levels of detail, the resultant separate enhanced VOB's are preferably consolidated into a single output stream of enhanced MD, and if that single stream contains time-related market data from different feeds that describes the same market at the same time, that time-related data is considered a single event and preferably is batched into a single message.

Similarly, enhanced MD originating from two different exchanges trading in the same financial instrument (the same atomic market) are preferably "aggregated" to provide an overview of the entire market, not just what is happening at a particular exchange. Each open order (whether authentic, implied, or obscure) in the resultant aggregated enhanced VOB is preferably tagged not only with the relevant time, but also with its source, thereby giving the trader the ability to make a more intelligent exchange selection when the same price is available from multiple sources. Conversely, the trader can simply request a price and quantity, and leave the order routing details to others. This is especially useful if the trader is part of an institution that employs a network of sophisticated order routers at multiple locations which each have the ability to make independent routing decisions as to which order should be directed to which exchange based upon the proximity and market liquidity of those exchanges still offering the requested quantity at the requested price.

"Batching" is a mechanism that gives a customer the ability to subscribe to enhanced market data for groups of feeds and/or markets and within the context of the subscription, maintain the original "atomic" nature of the incoming order flow or market data events, after they have been processed across multiple parallel components. preferably, the exchange MD interface assigns a unique ID to each such batch (typically a single message containing market event data relevant to more than one feed and/or market) of incoming MD and/or OF data. After each such batch has been split up and the respective data for each separate atomic market (e.g., a different currency pair) has been routed to a different VOB enhancer engine, the resulting multiple outputs of enhanced VOB data associated from that same batch of incoming data can then be consolidated by the enhanced MD interface into the same batch of outgoing data, in a style and format preferred by the receiving trading model.

Figure 3:
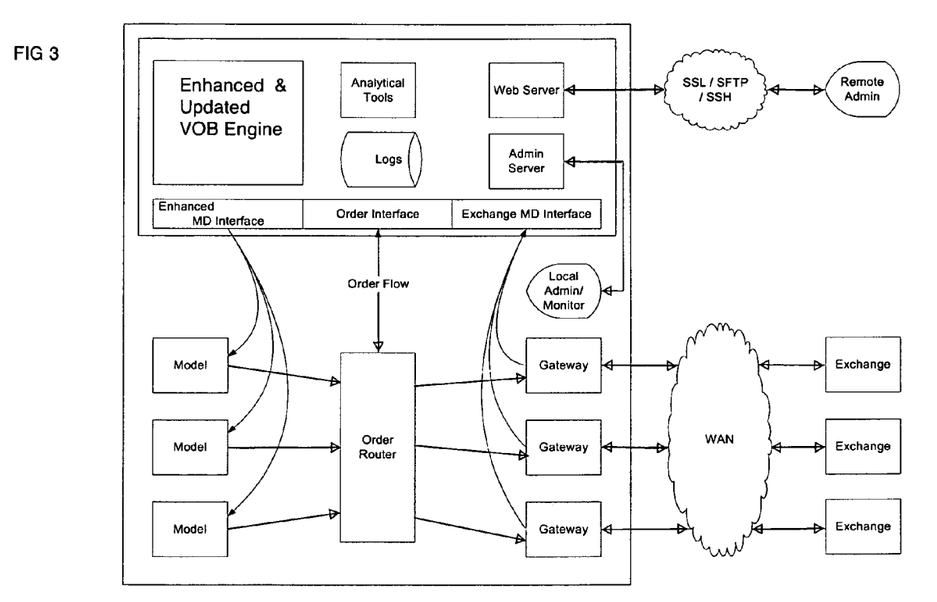
FIG. 3 shows an exemplary installation of the system of FIG. 2 connected via customer premise equipment to multiple exchanges.

FIG. 3 shows an exemplary installation of the MD enhancer system of FIG. 2 connected via customer premise equipment to multiple exchanges via respective gateways, which are each not only responsible for the proper transmission of the customer OF feed from a customer-specific order router to the designated exchange via a Wide Area Network (WAN), but also responsible for the proper transmission in the reverse direction of the MD and OF feeds from the exchange to the MD enhancer system via an exchange MD interface. As shown, the order router simply routes orders from the various traders and trading models to the gateway associated with the particular exchange selected by the trader, and simultaneously informs the MD enhancer system with details of those orders. The system also includes an enhanced MD interface which routes customized versions of the enhanced MD to the respective trading models.

As illustrated, the installed MD enhancer system is also preferably provided with analytical tools and logs, and can be administered either locally or over a secure connection to a remote administrator. In one preferred embodiment, the distributed market views available to a particular trader or trading platform may include an analytical MD feed that alternates at regular intervals (for example, every minute) between the original received market data and the enhanced market data, which provides the administrator with a useful analytical tool for quantifying any changes in an automated trading platform's performance attributable to the differences between the original and enhanced data.

Moreover, as discussed in more detail below, the order router could be one modular component of a more complex and intelligent order routing system responsible for optimal routing and rerouting of orders to different exchanges based on expected transmission delays and current market conditions. In order to more accurately determine the exact point in the time ordered MIO Data queue which corresponds to the true exchange time the current market data was generated and thus separates the order data already reflected in the current market data from the more recent order data that has not already been incorporated in the current market data, longer and shorter test sequences of current MIO data with different cutoff times may be successively combined with a previously received market data timeslice and the result compared to the most recently received market data timeslice, the test sequence producing the best match will indicate which of the orders and cancels currently included in the MIO data are now reflected in the current MD time slice, and thus should now be ignored (or discarded).

Figure 4:
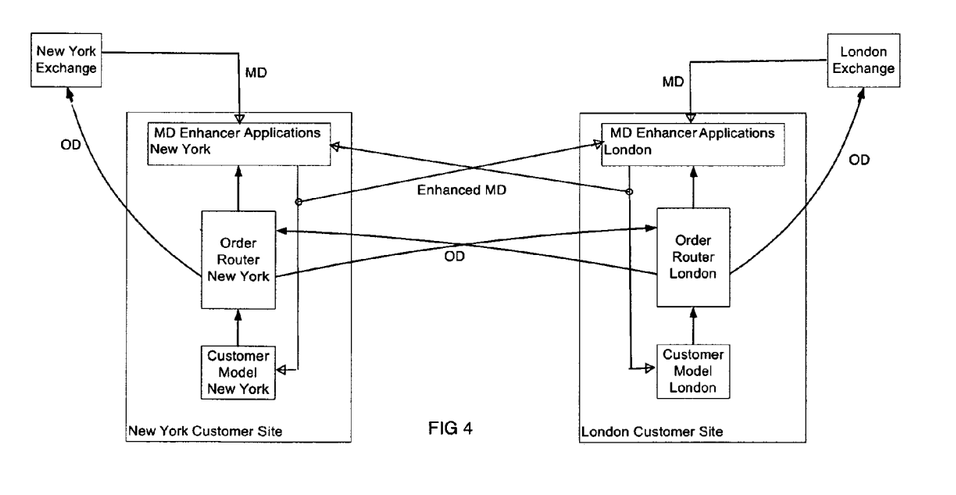
FIG. 4 shows a preferred configuration for connecting multiple customer sites to the same exchange, whereby a customer site closer to a particular exchange is responsible for routing all orders to that exchange and a second MD enhancer system at a more remote customer site receives enhanced market data from a first MD enhancer system at the closer site, which may then further enhance that enhanced data.

FIG. 4 shows a preferred configuration for connecting multiple customer sites to the same exchange, whereby a customer site (e.g., NY) closer to a particular exchange is responsible for routing all orders to that exchange and a second MD enhancer system at a more remote customer site (e.g. London) receives enhanced market data from a first MD enhancer system at the closer site, which may then further enhance that enhanced data.

Since the VOB processor at the closer location has already determined the best match between the exchange time associated with the current MD and the exchange times reflected in the recent OF, the remote VOB processors will preferably use that same timing to further enhance the received enhanced MD with similarly time stamped OF known to the remote VOB processor but not yet known to the closer VOB processor, preferably emulating the same VOB updating processes as used by the VOB processor at the closer location, so that synchronism is maintained between the updated VOB at the remote location and the correspondingly time stamped entries in the subsequently updated VOB at the closer location.

In the illustrated example, not only is the London site relieved of responsibility for determining the true NY exchange time each time a new batch of MD is received from the NY exchange, the received NY enhanced MD presumably had been updated in NY whenever any relevant acknowledgement of a London order or other London market events had been received from the NY exchange, so that the London site does not have to be concerned with identifying any authentic orders or estimating any obscure or implied orders or otherwise revising the current VOB, but merely has to perform a supplemental matching cycle on the current VOB using any unacknowledged London orders or cancels in the current London MIO that are not already reflected in the received NY enhanced VOB.

Although only one exchange and only two customer sites are illustrated, those skilled in the art will recognize that a similar exchange of enhanced MD can be added in the reverse direction to accommodate NY orders to a second exchange in London, and that rather than routing those orders directly from the remote trader's site to the site closest to the exchange, the orders and resulting enhanced MD can both be routed through an intermediate site, in which case the intermediate site can also submit orders to the closer site and can also update the received enhanced MD with its recently submitted orders before the enhanced MD is transmitted to the remote site.

Specific implementation details of a presently preferred commercial embodiment are set forth in the appended document entitled "WHISPERER Functional Specification Revision 0.92", which is hereby incorporated by reference. Those skilled in the art will doubtless recognize that many other embodiments of the invention can be constructed using some or all of the same concepts as are embodied in the described embodiments, and the legal scope of the invention is accordingly defined by the appended claims, including any known or yet unknown equivalents thereof.

The invention claimed is:

1. An automated system comprising at least one exchange and a plurality of geographically separated customer sites for using proprietary order flow information that reflects trading transactions at the customer sites that are not yet reflected in a current market data feed from the exchange to provide a trader or an automated trading model with an enhanced version of that market data, wherein:

said exchange comprises an automated subsystem for trading financial instruments in accordance with proprietary electronic order messages received from involved customer sites and proprietary electronic deal messages transmitted to said involved customer sites and a second automated subsystem for transmitting a digital market feed reflecting only a portion of the orders and deals processed by the exchange, and at least one of said customer sites comprises an automated market data enhancer sub system for deriving said enhanced version of said market data from the electronic order messages and the electronic deal messages that are not yet reflected in the digital market feed.

2. In an automated system for trading financial instruments connected to a computerized trading exchange receiving client proprietary electronic order messages from exchange clients, matching compatible said order messages to thereby identify deals between said exchange clients, transmitting client proprietary electronic deal messages only to the exchange clients associated with the identified deals, maintaining an exchange proprietary order book, and transmitting an exchange proprietary digital market data feed to at least one subscriber included among said exchange clients, said data feed reflecting a visible portion of said identified unmatched orders between all said exchange clients;

at least one computerized market data enhancer on the premises of a respective said subscriber independent of and remotely located from said computerized trading exchange and having access both to said market data feed and to client proprietary order flow information including any said electronic order messages from said respective subscriber and any said electronic deal messages to said respective subscriber, said market data enhancer being programmed to:

identify at least some of said client proprietary order flow information as market impact overlay data that not reflected in said exchange proprietary data feed, and combine selected data from said exchange proprietary market feed with selected portions of said market impact overlay data to thereby produce an enhanced version of that market data feed.

3. The system of claim 2 wherein said computerized market data enhancer combines said client proprietary electronic deal messages with said market feed data to thereby produce a virtual deal feed that that includes details of deals not reflected in said deal messages.

4. The system of claim 2 further comprising a second said computerized market data enhancer on the premises of a second subscriber, wherein said second computerized market data enhancer is remotely located both from said computerized trading exchange and from said one computerized market data enhancer, and said one computerized market data enhancer also receives at least some of said client proprietary order flow information from said second subscriber and uses said at least some information to produce said enhanced market data feed.

5. The system of claim 4, wherein said second computerized market data enhancer receives said market data feed in the form of said enhanced market data feed produced by said one computerized market data enhancer.

6. The system of any one of claims 1 through 5, wherein the exchange is a foreign currency exchange.

7. The system of any one of claims 1 though 5, wherein market feed data for a particular SPOT foreign currency pair from multiple exchanges are aggregated to form a single atomic market for that SPOT foreign currency pair.

8. The system of any one of claims 2 through 5, wherein the subscriber is an institution that includes more than one trader or trading floors dealing in a particular financial instrument on a particular financial exchange, and the computerized market data enhancer has access to the institution's client proprietary order flow information concerning orders or deals on that exchange involving that financial instrument.

9. The system of any one of claims 2 through 5, wherein said enhanced data stream includes obscure orders that are not visible in the exchange proprietary data feed.

* * * * *